(12) United States Patent
Song et al.

(10) Patent No.: US 12,334,982 B2
(45) Date of Patent: Jun. 17, 2025

(54) SINGLE-OPTICAL-FIBER BIDIRECTIONAL TRANSCEIVING DEVICE AND OPTICAL FIBER COMMUNICATION SYSTEM

(71) Applicant: ACCELINK TECHNOLOGIES CO., LTD., Wuhan (CN)

(72) Inventors: Qionghui Song, Wuhan (CN); Yi Hu, Wuhan (CN); Bo Zhang, Wuhan (CN)

(73) Assignee: ACCELINK TECHNOLOGIES CO., LTD., Wuhan (CN)

( * ) Notice: Subject to any disclaimer, the term of this patent is extended or adjusted under 35 U.S.C. 154(b) by 46 days.

(21) Appl. No.: 18/247,030

(22) PCT Filed: Dec. 10, 2020

(86) PCT No.: PCT/CN2020/135488
§ 371 (c)(1),
(2) Date: Mar. 28, 2023

(87) PCT Pub. No.: WO2022/088412
PCT Pub. Date: May 5, 2022

(65) Prior Publication Data
US 2023/0379059 A1    Nov. 23, 2023

(30) Foreign Application Priority Data

Oct. 26, 2020    (CN) .......................... 202011157904.7

(51) Int. Cl.
*H04B 10/40*    (2013.01)
*G02B 6/42*    (2006.01)
*H04B 10/25*    (2013.01)

(52) U.S. Cl.
CPC ........... *H04B 10/40* (2013.01); *G02B 6/4246* (2013.01); *H04B 10/2589* (2020.05)

(58) Field of Classification Search
CPC .... H04B 10/40; H04B 10/2589; H04B 10/43; H04B 10/25891; G02B 6/4246;
(Continued)

(56) References Cited

U.S. PATENT DOCUMENTS 5,982,539 A * 11/1999 Shirasaki ................ G02F 1/093
385/11
6,373,604 B1 * 4/2002 Xie ....................... G02B 6/2766
398/79
(Continued)

FOREIGN PATENT DOCUMENTS

CN    102854564 A    1/2013
CN    104459904 A    3/2015
(Continued)

OTHER PUBLICATIONS

International Search Report and Written Opinion issued in International Application No. PCT/CN2020/135488, mailed on Jul. 27, 2021.
(Continued)

*Primary Examiner* — Hibret A Woldekidan
(74) *Attorney, Agent, or Firm* — Knobbe Martens Olson & Bear LLP (57) ABSTRACT

Disclosed are a single-optical-fiber bidirectional transceiving device and an optical fiber communication system. The device comprises a composite optical transmission port being coupled with an optical fiber; an optical input port for outputting an inputted emitting signal to the composite optical transmission port; an optical output port for outputting a receiving signal input from the composite optical transmission port; an bidirectional optical transmission assembly for transmitting the receiving signal input from the composite optical transmission port to an optical guide assembly and an emitting signal output from the optical guide assembly to the composite optical transmission port;
(Continued)

and the optical guide assembly for transmitting the emitting signal input from the optical input port to the bidirectional optical transmission assembly and a receiving signal output from the bidirectional optical transmission assembly to the optical output port, whereby a bidirectional optical transceiving function can be realized through a single optical fiber.

10 Claims, 3 Drawing Sheets

(58) Field of Classification Search
CPC .... G02B 6/272; G02B 6/2726; G02B 27/283; G02B 6/2793; G02B 6/34
See application file for complete search history.

(56) References Cited

U.S. PATENT DOCUMENTS

| | | | |
|---|---|---|---|
| 7,277,180 B2 * | 10/2007 | Townley-Smith | G01B 9/02003 356/487 |
| 9,625,650 B2 | 4/2017 | Du et al. | |
| 9,989,700 B1 * | 6/2018 | Ayliffe | G02B 6/4246 |
| 2009/0196617 A1 | 8/2009 | Yoshizaki et al. | |

FOREIGN PATENT DOCUMENTS

| | | |
|---|---|---|
| CN | 205229520 U | 5/2016 |
| CN | 106908912 A | 6/2017 |
| CN | 107688215 A | 2/2018 |
| CN | 109061814 A | 12/2018 |
| CN | 111812776 A | 10/2020 |
| CN | 112235050 B | 3/2022 |
| JP | 2009222893 A | 10/2009 |

OTHER PUBLICATIONS

Search Report issued in Chinese Application No. 2020111579047, dated May 27, 2021.

Supplementary Search Report issued in Chinese Application No. 2020111579047, dated Sep. 1, 2021.

Supplementary Search Report issued in Chinese Application No. 2020111579047, dated Dec. 9, 2021.

Yan, Shijia, "Research and Implementation of A Wavelength Division Multiplexed Single Fiber Bi-Directional Data Transceiver Module", China Master's Theses Full-text Database, Basic Sciences, Mar. 15, 2020.

* cited by examiner

SINGLE-OPTICAL-FIBER BIDIRECTIONAL TRANSCEIVING DEVICE AND OPTICAL FIBER COMMUNICATION SYSTEM

CROSS-REFERENCE TO RELATED APPLICATION(S)

The present disclosure claims the priority of a Chinese patent application No. 202011157904.7 filed on Oct. 26, 2020, the disclosure of which is hereby incorporated by reference herein in its entirety.

TECHNICAL FIELD OF THE DISCLOSURE

The present disclosure relates to a technical field of optical communication, and in particular, to a single-optical-fiber bidirectional transceiving device and an optical fiber communication system.

BACKGROUND

With the progresses and developments of communication technologies, optical fiber communication has become more and more popular, and the optical fiber communication system becomes more and more applied. Meanwhile, the data communication business volume is also continuously increased, so that the demand volume of the optical transceiver module commonly applied in the communication system is rapidly increased. The transmission and reception of many optical transceiver modules need to be transmitted through two optical fibers. The use of plenty of optical fibers will increase the material cost of the whole data center and the optical fiber management cost.

SUMMARY

In a first aspect, an embodiment of the present disclosure provides a single-optical-fiber bidirectional transceiving device.

The single-optical-fiber bidirectional transceiving device provided by the embodiment of the present disclosure comprises:

an optical input port, an optical output port, and a composite optical transmission port, wherein the optical input port is located on a first end face, and is configured to output an emitting signal, which is input from the optical input port, to the composite optical transmission port;

the optical output port is located on the first end face juxtaposed with the optical input port, and is configured to output a receiving signal input from the composite optical transmission port;

the composite optical transmission port is located on a second end face which is opposite to the first end face, and is configured to be coupled with an optical fiber;

a bidirectional optical transmission assembly and an optical guide assembly, wherein the bidirectional optical transmission assembly and the optical guide assembly are both located between the first end face and the second end face, the bidirectional optical transmission assembly is located between the second end face and the optical guide assembly, and the optical guide assembly is located between the first end face and the bidirectional optical transmission assembly, wherein the bidirectional optical transmission assembly is configured to transmit the receiving signal input from the composite optical transmission port to the optical guide assembly, and transmit the emitting signal output from the optical guide assembly to the composite optical transmission port; and the optical guide assembly is configured to transmit the emitting signal input from the optical input port to the bidirectional optical transmission assembly, and transmit the receiving signal output from the bidirectional optical transmission assembly to the optical output port.

Preferably, the optical input port is a plurality of optical input ports set in parallel, and the optical output port is a plurality of optical output ports set in parallel;

the optical guide assembly comprises a beam combining waveguide structure and a beam splitting waveguide structure set in parallel, wherein the beam combining waveguide structure has an input end facing the plurality of optical input ports and an output end facing the bidirectional optical transmission assembly, and is configured to combine a plurality of emitting signals incident by the plurality of optical input ports and transmit the emitting signals being combined to the bidirectional optical transmission assembly; and the beam splitting waveguide structure has an input end facing the bidirectional optical transmission assembly and an output end facing a plurality of optical input ports, and is configured to divide the receiving signal output by the bidirectional optical transmission assembly into a plurality of light-splitting receiving signals respectively corresponding to the plurality of parallel optical output ports, and transmit the different light-splitting receiving signals to different optical output ports.

Preferably, the optical guide assembly is a PLC chip.

Preferably, the bidirectional optical transmission assembly comprises:

a first transmission assembly, a second transmission assembly, and a third transmission assembly, which are located sequentially in a direction from the first end face to the second end face in the bidirectional optical transmission assembly, wherein:

the first transmission assembly comprises a first polarization light-splitting prism and an optical path offset prism connected to the first polarization light-splitting prism in a vertical direction, wherein the first polarization light-splitting prism has a first prism end face and a second prism end face, and the optical path offset prism has a third prism end face and a fourth prism end face, the third prism end face being bonded with the first prism end face;

the second transmission assembly comprises a Faraday rotating plate, and a first half-wave plate, a second half-wave plate and a third half-wave plate which three are bonded with surfaces of the Faraday rotating plate, wherein the first half-wave plate and the second half-wave plate are both bonded with a first surface of the Faraday rotating plate, the first half-wave plate being bonded with an upper half portion of the first surface, the second half-wave plate being bonded with a lower half portion of the first surface; the third half-wave plate is bonded with a lower half portion of a second surface of the Faraday rotating plate, directly facing the second half-wave plate; and the first surface and the second surface are two parallel faces directly facing the Faraday rotating plate; and the third transmission assembly comprises a second polarization light-splitting prism and a triangular prism which are connected in a vertical direction, wherein the second polarization light-splitting prism has a fifth prism end face and a sixth prism end face, wherein the fifth prism end face is connected with an inclined surface of the triangular prism, and a vertical surface of the triangular prism in the vertical direction directly faces the third half-wave plate.

Preferably, the single-optical-fiber bidirectional transceiving device further comprises:

a first collimating lens, which is located between the optical guide assembly and the bidirectional optical transmission assembly, and which is configured to collimate the combined emitting signal output from the beam combining waveguide structure;

a second collimating lens, which is arranged in parallel with the first collimating lens, and which is configured to collimate the receiving signal output from the bidirectional optical transmission assembly; and a third collimating lens, which is located between the bidirectional optical transmission assembly and the optical fiber, and which is configured to collimate the emitting signal transmitted to the composite optical transmission port, and is configured to collimate the receiving signal transmitted to the bidirectional optical transmission assembly by the optical fiber.

Preferably, the single-optical-fiber bidirectional transceiving device further comprises:

a lens array, which is located between the plurality of optical input ports and the optical guide assembly, lenses in which are in one-to-one correspondence with each optical input port in the plurality of optical input ports, and which is configured to couple the emitting signals input from the plurality of optical input ports into the beam combining waveguide structure of the optical guide assembly.

Preferably, a signal transmission end of the beam splitting waveguide structure in the optical guide assembly is provided with a plurality of signal reflective inclined surfaces in one-to-one correspondence with the plurality of optical output ports, and the plurality of light-splitting receiving signals output by the beam splitting waveguide structure are reflected to the optical output port through the signal reflecting inclined surface.

Preferably, the bidirectional optical transmission assembly has an annular optical path inside;

wherein the annular optical path comprises a first end point located on the first prism end face of the first polarization light-splitting prism and a second end point located on the fifth prism end face of the second polarization light-splitting prism, which are respectively located on different positions on the annular optical path, wherein an output optical path comprising a first optical path and a second optical path is formed from the first end point to the second end point, and the output optical path is configured to output the emitting signal input in a first incident direction at the first end point; and an input optical path comprising a third optical path and a fourth optical path is formed from the second end point to the first end point, and the input optical path is configured to input the receiving signal output in a first exit direction at the first end point; the first incident direction and the first exit direction are different; and a transmission direction of the first optical path and is opposite to that of the third optical path, and a transmission direction of the second optical path is opposite to that of the fourth optical path.

Preferably, the first optical path and the third optical path respectively comprise:

the first polarization light-splitting prism, the first half-wave plate, the Faraday rotating plate, and the second polarization light-splitting prism; and the second optical path and the fourth optical path respectively comprise:

the first polarization light-splitting prism, the second half-wave plate, the Faraday rotating plate, the third half-wave plate, the triangular prism and the second polarization light-splitting prism.

Preferably, a polarization deflection angle of the third half-wave plate is twice as large as a polarization deflection angle of the Faraday rotating plate.

The technical solutions provided by the embodiments of the present disclosure may include the following beneficial effects:

The single-optical-fiber bidirectional transceiving device of the embodiments of the present disclosure integrates an optical input port, an optical output port, a composite optical transmission port, a bidirectional optical transmission assembly which is configured to transmit a receiving signal input from the composite optical transmission port to an optical guide assembly and transmit an emitting signal output from the optical guide assembly to the composite optical transmission port, and the optical guide assembly which is configured to transmit the emitting signal input from the optical input port to the bidirectional optical transmission assembly and transmit a receiving signal output from the bidirectional optical transmission assembly to the optical output port. Meanwhile, the optical guide assembly may use an integrated chip with both a multiplexing function and a demultiplexing function. An output end waveguide configured to be multiplexed in the integrated chip and an input waveguide configured to be demultiplexed may be designed close to each other, so that the overall size of the chip is smaller, and then the structural size of the bidirectional optical transmission assembly can be reduced. As a result, the whole device is integrated and compact while the bidirectional optical transceiving function of the single optical fiber is realized through the single-optical-fiber bidirectional transceiving device. Since the integrated chip is a stable and reliable single chip, it has higher stability and reliability compared with a conventional discrete assembly, and therefore, it is conducive to improving the overall stability and reliability of the device.

DETAILED DESCRIPTION

In order to make the technical solutions and advantages of the embodiments of the present disclosure clearer, the technical solutions defined in the embodiments of the present disclosure will be clearly and completely described below in conjunction with the accompanying drawings in the embodiments of the present disclosure. Obviously, the described embodiments are a portion of the embodiments of the present disclosure, but not all embodiments.

Figure 1:
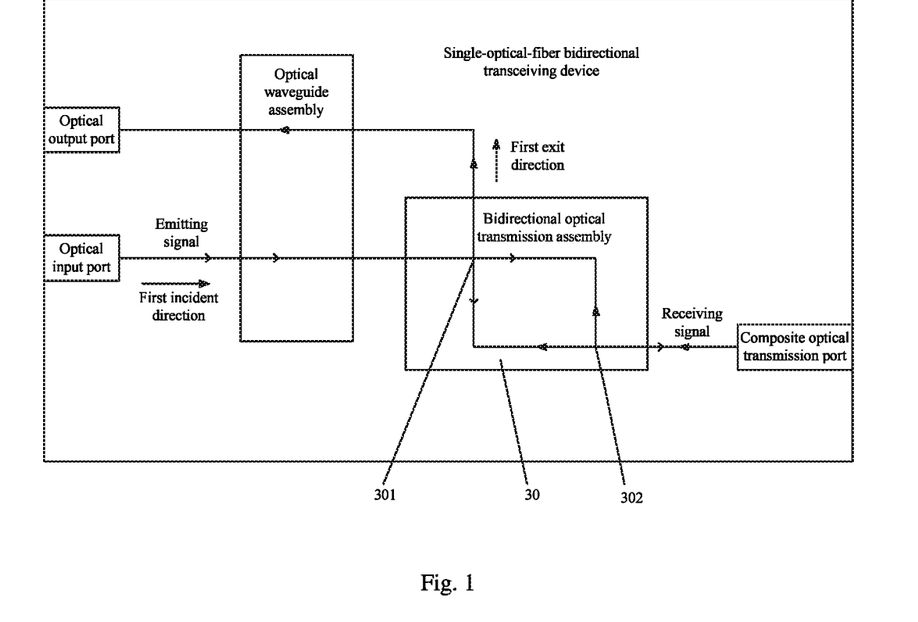
FIG. 1 is a schematic structural diagram of a single-optical-fiber bidirectional transceiving device according to an exemplary embodiment.

The present disclosure provides a single-optical-fiber bidirectional transceiving device. FIG. 1 is a schematic structural diagram of a single-optical-fiber bidirectional transceiving device according to an exemplary embodiment. As shown in FIG. 1, the single-optical-fiber bidirectional transceiving device comprises:

an optical input port, an optical output port, and a composite optical transmission port, wherein the optical input port is located on a first end face, and is configured to output an emitting signal, which is input from the optical input port, to the composite optical transmission port;

the optical output port is located on the first end face in parallel with the optical input port, and is configured to output a receiving signal input from the composite optical transmission port; and the composite optical transmission port is located on a second end face which is set opposite to the first end face, and is configured to be coupled with an optical fiber;

a bidirectional optical transmission assembly and an optical guide assembly both located between the first end face and the second end face, wherein the bidirectional optical transmission assembly is located between the second end face and the optical guide assembly, and the optical guide assembly is located between the first end face and the bidirectional optical transmission assembly, wherein the bidirectional optical transmission assembly is configured to transmit the receiving signal input from the composite optical transmission port to the optical guide assembly, and transmit an emitting signal output from the optical guide assembly to the composite optical transmission port; and the optical guide assembly is configured to transmit the emitting signal input from the optical input port to the bidirectional optical transmission assembly, and transmit the receiving signal output from the bidirectional optical transmission assembly to the optical output port.

In the present exemplary embodiment, the single-optical-fiber bidirectional transceiving device integrates the optical input port, the optical output port, the composite optical transmission port, the bidirectional optical transmission assembly which is configured to transmit the receiving signal input from the composite optical transmission port to the optical guide assembly and transmit the emitting signal output from the optical guide assembly to the composite optical transmission port, and the optical d assembly which is configured to transmit the emitting signal input from the optical input port to the bidirectional optical transmission assembly and transmit the receiving signal output from the bidirectional optical transmission assembly to the optical output port. Meanwhile, the optical guide assembly may use an integrated chip having both a multiplexing function and a demultiplexing function. In the integrated chip, an output end waveguide configured to be multiplexed and an input waveguide configured to be demultiplexed may be designed close to each other, so that the overall size of the chip is smaller, and then the structural size of the bidirectional optical transmission assembly can be reduced, so that the single-optical-fiber bidirectional transceiving device as a whole is integrated and compact while it achieves the bidirectional optical transceiving function on a single optical fiber. Since the integrated chip is a stable and reliable single chip, it has higher stability and reliability compared with a conventional discrete assembly, and therefore, it is conducive to improving the overall stability and reliability of the device.

Figure 2:
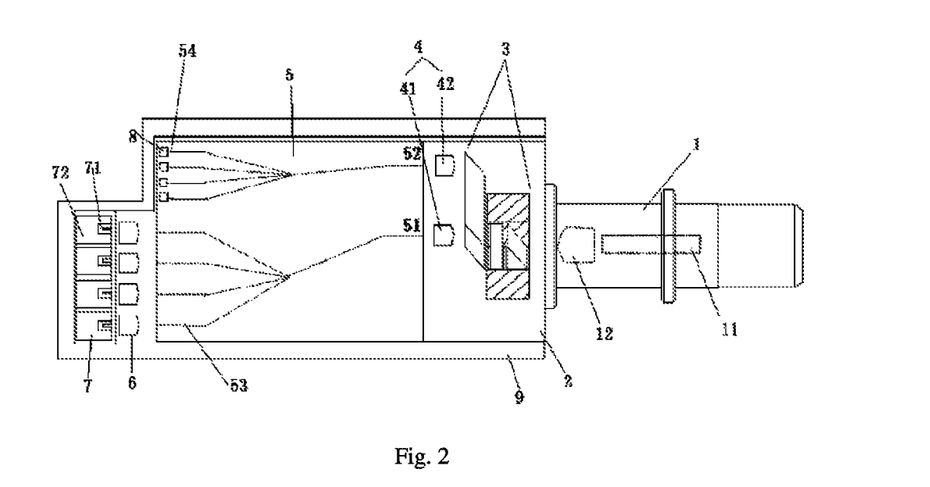
FIG. 2 is a cross-sectional schematic diagram of a single-optical-fiber bidirectional transceiving device according to an exemplary embodiment.

In some embodiments, FIG. 2 is a cross-sectional schematic diagram of a single-optical-fiber bidirectional transceiving device according to an exemplary embodiment. As shown in FIG. 2, the optical input port of the single-optical-fiber bidirectional transceiving device is a plurality of optical input ports set in parallel, and the optical output port is a plurality of optical output ports set in parallel; and the optical guide assembly 5 comprises a beam combining waveguide structure and a beam splitting waveguide structure which are set in parallel, wherein the beam combining waveguide structure has an input end facing the plurality of optical input ports and an output end facing the bidirectional optical transmission assembly 3, and is configured to combine a plurality of the emitting signals incident from the plurality of optical input ports and transmit the combined transmitting signals to the bidirectional optical transmission assembly 3; and the beam splitting waveguide structure has an input end facing the bidirectional optical transmission assembly 3 and an output end facing the plurality of optical input ports, and is configured to divide the receiving signal output from the bidirectional optical transmission assembly 3 into a plurality of light-splitting receiving signals respectively corresponding to the plurality of parallel optical output ports, and transmit different light-splitting receiving signals to different optical output ports.

In the exemplary embodiment, the beam combining waveguide structure and the beam splitting waveguide structure are provided in the optical guide assembly 5. The beam combining waveguide structure may comprise a waveguide structure and a beam combiner. The beam splitting waveguide structure may comprise a waveguide structure and a beam splitter. It is realized by means of the beam combining waveguide structure that a plurality of the emitting signals incident from the plurality of optical input ports are combined, and then the combined emitting signal is transmitted to the bidirectional optical transmission assembly 3; and it is realized by means of the beam splitting waveguide structure that the receiving signal output by the bidirectional optical transmission assembly 3 is split into a plurality of light-splitting receiving signals respectively corresponding to the plurality of parallel optical output ports, and then different light-splitting receiving signals are transmitted to different optical output ports. Thus, the number of emitting signals of the single-optical-fiber bidirectional transceiving device and the number of signals configured for performing signal detection are expanded through the optical guide assembly 5.

In a specific application, a plurality of light having a single wavelength is input through a plurality of optical input ports, and then is combined into one beam of composite light through the beam combining waveguide structure and transmitted to the bidirectional optical transmission module 3. By the beam splitting waveguide structure, the composite light transmitted by an optical fiber is split into a plurality of light having a single wavelength and then transmitted to a plurality of optical output ports for output, which is for being obtained by an optical signal detection assembly.

In some embodiments, the optical guide assembly is a PLC chip.

In the present exemplary embodiment, the optical guide assembly may be a small PLC integrated chip having both a multiplexing function and a demultiplexing function. In the PLC chip, the output end waveguide configured to multiplex signals and the input waveguide configured to demultiplex a signal may be designed close to each other, so that the overall size of the chip is smaller, and then the structural size of the bidirectional optical transmission assembly can be reduced. As a result, the single-optical-fiber bidirectional transceiving device as a whole is integrated and compact while the bidirectional optical transceiving function of the single optical fiber is realized. Since the integrated chip is a stable and reliable single chip, it has higher stability and reliability compared with a conventional discrete assembly, and therefore, it is conducive to improving the overall stability and reliability of the device.

Figure 3:
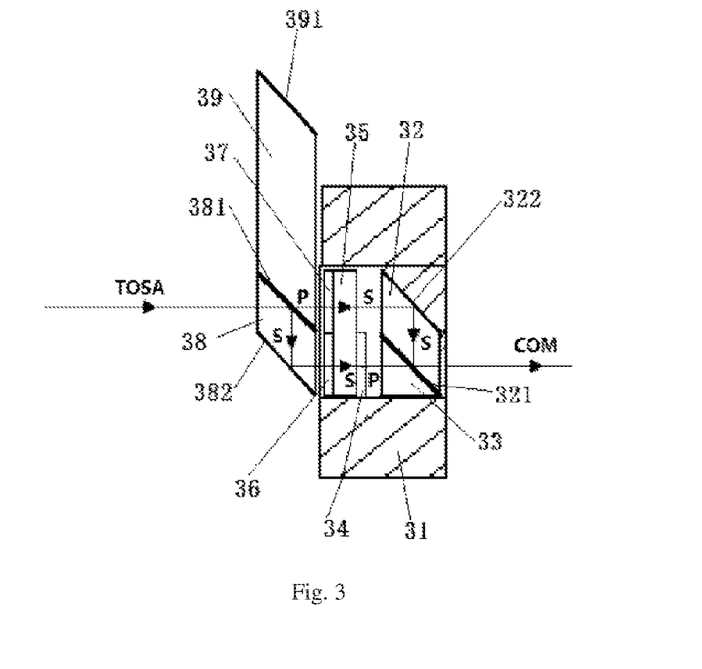
FIG. 3 is a first schematic structural diagram of a bidirectional optical transmission assembly according to an exemplary embodiment.
Figure 4:
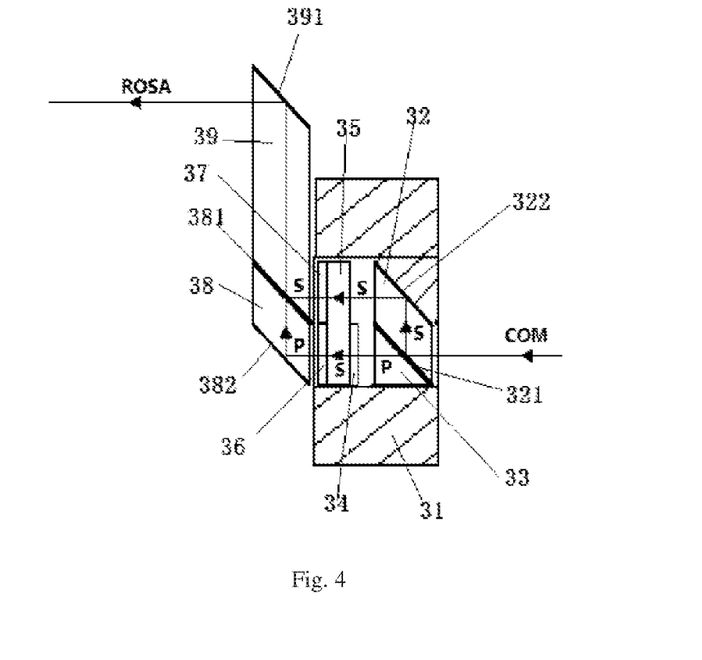
FIG. 4 is a second schematic structural diagram of a bidirectional optical transmission assembly according to an exemplary embodiment.

In some embodiments, FIG. 3 is a first schematic structural diagram of a bidirectional optical transmission assembly according to an exemplary embodiment. FIG. 4 is a second schematic structural diagram of a bidirectional optical transmission assembly 3 according to an exemplary embodiment. As shown in FIG. 3 and FIG. 4, the bidirectional optical transmission assembly sequentially comprises in a direction from the first end face to the second end face:

a first transmission assembly, a second transmission assembly, and a third transmission assembly, wherein the first transmission assembly comprises a first polarization light-splitting prism 38 and an optical path offset prism 39 connected to the first polarization light-splitting prism 38 in a vertical direction, wherein the first polarization light-splitting prism 38 has a first prism end face and a second prism end face, and the optical path offset prism 39 has a third prism end face and a fourth prism end face, the third prism end face being bonded with the first prism end face;

the second transmission assembly comprises a Faraday rotating plate 35, and a first half-wave plate 37, a second half-wave plate 36 and a third half-wave plate 34 which three are bonded with surfaces of the Faraday rotating plate 35, wherein the first half-wave plate 37 and the second half-wave plate 36 are both bonded with a first surface of the Faraday rotating plate 35, the first half-wave plate 37 is bonded with an upper half portion of the first surface, and the second half-wave plate 36 is bonded with a lower half portion of the first surface; the third half-wave plate 34 is bonded with a lower half portion of a second surface of the Faraday rotating plate 35, directly facing the second half-wave plate 36; and the first surface and the second surface are two parallel faces directly facing the Faraday rotating plate 35; and the third transmission assembly comprises a second polarization light-splitting prism 32 and a triangular prism 33 which are connected with each other in the vertical direction, wherein the second polarization light-splitting prism 32 has a fifth prism end face and a sixth prism end face, the fifth prism end face is connected with an inclined surface of the triangular prism 33, and a vertical surface of the triangular prism 33 in the vertical direction directly faces the third half-wave plate 34.

In the present exemplary embodiment, the first prism end face has a first polarization light splitting film 381, and the second prism end face has a first reflecting film 382; the fifth prism end face has a second polarization light splitting film 321, and the sixth prism end face has a third reflecting film 322; the fourth prism end face has a second reflecting film 391; the first polarization light splitting film 381 is configured to be incident onto the first prism end face of the first polarization light-splitting prism 38 for penetrating an optical signal which has a first polarization angle, and reflecting an optical signal which has a second polarization angle;

the first reflecting film is configured to reflect all of the optical signals;

the second polarization light splitting film 321 is configured to be incident onto the third prism end face of the polarization light-splitting prism for penetrating an optical signal having the first polarization angle, and reflecting an optical signal having the second polarization angle;

the third reflecting film is configured to reflect all of the optical signals;

the first half-wave plate 37 and the Faraday rotating plate 35 have equal polarization deflection angles in a same direction, and are configured to convert from a polarization angle of an optical signal having the first polarization angle transmitted from the first polarization light-splitting prism 38 to the second polarization light-splitting prism 32 into the second polarization angle; and the first half-wave plate 37 and the Faraday rotating plate 35 have equal polarization deflection angles in opposite directions, and are configured to remain a polarization angle of an optical signal having the second polarization angle transmitted from the second polarization light-splitting prism 32 to the first polarization light-splitting prism 38 unchanged;

the second half-wave plate 36 and the Faraday rotating plate 35 have equal polarization deflection angles in opposite directions, and are configured to remain a polarization angle of an optical signal having the second polarization angle transmitted from the first polarization light-splitting prism 38 to the second polarization light-splitting prism 32 unchanged;

the second half-wave plate 36 and the Faraday rotating plate 35 have equal polarization deflection angles in a same direction, and are configured to convert a polarization angle of an optical signal having the second polarization angle transmitted from the second polarization light-splitting prism 32 to the first polarization light-splitting prism 38 into the first polarization angle;

the third half-wave plate 34 is configured to convert a polarization angle of an optical signal having the second polarization angle transmitted from the first polarization light-splitting prism 38 to the second polarization light-splitting prism 32 into the first polarization angle; and is configured to convert a polarization angle of an optical signal having the first polarization angle transmitted from the second polarization light-splitting prism 32 to the first polarization light-splitting prism 38 into the second polarization angle;

the triangular prism 33 is configured to transmit an optical signal received from the third half-wave plate 34 to the fifth prism end face of the second polarization light-splitting prism 32, and to transmit an optical signal received from the second polarization light-splitting prism 32 to the third half-wave plate 34;

the optical path offset prism 39 is configured to receive an optical signal which is penetrated by the first polarization light splitting film 381 and is transmitted from the first polarization light-splitting prism 38 to the second polarization light-splitting prism 32, to receive an optical signal which is penetrated and reflected by the first polarization light-splitting prism 381 and is transmitted from the second polarization light-splitting prism 32 to the first polarization light-splitting prism 38, and to transmit all of the received optical signals to the fourth prism end face of the optical path offset prism 39; and the second reflecting film is configured to reflect the optical signal received by the optical path offset prism 39 to the optical output port.

In some embodiments, the single-optical-fiber bidirectional transceiving device, as shown in FIG. 2, further comprises:

a first collimating lens 41, which is located between the optical guide assembly 5 and the bidirectional optical transmission assembly 3, and is configured to collimate the combined emitting signal output by the beam combining waveguide structure;

a second collimating lens 42, which is arranged in parallel with the first collimating lens, and is configured to collimate the receiving signal output by the bidirectional optical transmission assembly 3;

a third collimating lens 12, which is located between the bidirectional optical transmission assembly 3 and the optical fiber, and is configured to collimate the emitting signal conducted to the composite optical transmission port 1, and is configured to collimate the receiving signal transmitted from the optical fiber to the bidirectional optical transmission assembly 3.

In the present exemplary embodiment, an input end of the first collimating lens is opposite to the output end of the beam combining waveguide structure, and an output end of the first collimating lens is opposite to a first end point 301 of the bidirectional optical transmission assembly 3 as shown in FIG. 1, so as to transmit a light beam where the collimated emitting signal is located to an annular optical path.

In the present exemplary embodiment, an input end of the second collimating lens is opposite to the bidirectional optical transmission assembly 3, and an output end of the second collimating lens is opposite to the input end of the beam splitting waveguide structure, so as to collimate the receiving signal received from the optical fiber output by the bidirectional optical transmission assembly 3 and then transmit it to the optical guide assembly 5, and then split it through the beam splitting waveguide structure.

In the present exemplary embodiment, an input end of the third collimating lens is opposite to a second end point 302 of the bidirectional optical transmission assembly 3 as shown in FIG. 1, and an output end of the third collimating lens is opposite to the optical fiber, so as to collimate the signal transmitted through the optical fiber and transform the light input or output by the optical fiber into collimated light.

In some embodiments, as shown in FIG. 2, the single-optical-fiber bidirectional transceiving device further comprises:

a lens array 6, which is located between the plurality of optical input ports and the optical guide assembly 5, wherein collimating lenses in the lens array 6 are in one-to-one correspondence with each optical input port of the plurality of optical input ports, and are configured to couple the emitting signals input by the plurality of optical input ports into the beam combining waveguide of the optical guide assembly.

In the present exemplary embodiment, the lenses in the lens array 6 are set in parallel to form a one-to-one correspondence with the plurality of optical input ports.

Figure 7:
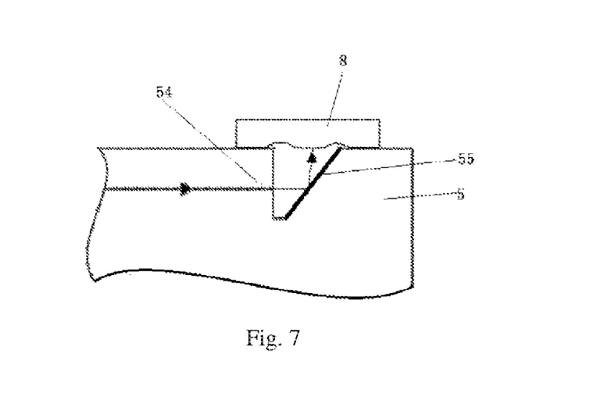
FIG. 7 is a partial enlarged view of a signal transmission end of a beam splitting waveguide structure in a single-optical-fiber bidirectional transceiving device according to an exemplary embodiment.

In some embodiments, FIG. 7 is a partial enlarged view of a signal transmission end of a beam splitting waveguide structure in a single-optical-fiber bidirectional transceiving device according to an exemplary embodiment. As shown in FIG. 7, a signal transmission end of the beam splitting waveguide structure 54 in the optical guide assembly 5 is provided with a plurality of signal reflective inclined surfaces 55 in one-to-one correspondence with the plurality of optical output ports, and the plurality of light-splitting receiving signals output by the beam splitting waveguide structure 54 are reflected to the optical output port through the signal reflecting inclined surface 55.

In the present exemplary embodiment, the reflective inclined surface is plated with a reflecting film, which may reflect the light from the beam splitting waveguide structure to an approximatively vertical direction and to be incident into the optical signal detection assembly 8 on the upper surface of the optical guide assembly 5, for example, in the photosensitive surface of the detector array.

In the present exemplary embodiment, the single-optical-fiber bidirectional transceiving device further comprises:

a magnetic block which is arranged on the periphery of the Faraday rotating plate 35, and is configured to electromagnetically drive the Faraday rotating plate 35 to have a rotating angle.

The single-optical-fiber bidirectional transceiving device provided in the present disclosure may realize the bidirectional optical transceiving function through a single optical fiber, which not only decreases the usage amount of optical fiber, but also reduces the maintenance cost of the device, meanwhile, the integration degree is high, and the size is small. It should be configured as a compact optical module with a communication rate of 100 G or more than 400 G.

In this exemplary embodiment, as shown in FIG. 2, the single-optical-fiber bidirectional transceiving device further comprises:

a housing, in which the optical guide assembly 5, the bidirectional optical transmission assembly 3, and each lens are all set, wherein a first end face of the housing is provided with a transmission port corresponding to a plurality of optical input ports and a plurality of optical output ports; and a second end face of the housing is provided with a transmission port corresponding to a composite optical transmission port 1. The second end face of the housing extends outwards and is provided with a through hole. The through hole is docked with the composite optical transmission port 1. Further, an optical fiber pin 11 is set in the through hole.

In some embodiments, the bidirectional optical transmission assembly has an annular optical path inside.

As shown in FIG. 3, the annular optical path comprises a first end point 301 located on the first prism end face of the first polarization light-splitting prism and a second end point 302 located on the fifth prism end face of the second polarization light-splitting prism, which are located at different positions on the annular optical path, wherein an output optical path comprising a first optical path and a second optical path is formed from the first end point 301 to the second end point, and is configured to output an emitting signal input at the first end point 301 in a first incident direction; and an input optical path comprising a third optical path and a fourth optical path is formed from the second end point 302 to the first end point, and is configured to input a receiving signal output in a first exit direction at the first end point; wherein the first incident direction and the first exit direction are different; the transmission directions of the first optical path and the third optical path are opposite, and the transmission directions of the second optical path and the fourth optical path are opposite.

In the present exemplary embodiment, both the emitting signal and the receiving signal may be incident into the single-optical-fiber bidirectional transceiving device by loading on the optical carrier. The transmission optical path where the emitting signal is located may be incident at the first end point in the first incident direction, and after transmitting through the annular optical path, it is exited from the second end point and enters the optical fiber through the composite optical transmission port.

Meanwhile, as shown in FIG. 1, the receiving signal output from the optical fiber enters the annular optical path 30 at the second end point 302, and after being transmitted through the annular optical path 30, the receiving signal which is transmitted in a transmission optical path is exited to an optical output port at the first end point 301 in a first exit direction, so as to be obtained by an optical signal detection assembly. Since the first incident direction of the emitting signal is different from the first exit direction of the receiving signal, it causes that when the receiving signal is input through the input optical path, the exit direction of the receiving signal after it leaves the annular optical path is different from the incident direction of the emitting signal when it enters the annular optical path, so that when the single-optical-fiber bidirectional transceiving device transceives signals at the same time, it may distinguish the receiving signal from the emitting signal, ensuring that the single-optical-fiber bidirectional transceiving device can communicate normally when transceiving signals.

In the present exemplary embodiment, the range of a difference angle of the first incident direction and the first exit direction is between 0-180 degrees, as long as the transmission optical path where the emitting signal is located before entering the annular optical path and the transmission optical path where the receiving signal is located after being emitted from the annular optical path do not coincide. For example, at the first end point 301, an angle between the first incident direction and the first exit direction is 90 degrees, i.e. the first incident direction and the first exit direction are perpendicular to each other, and the emitting signal is input to the annular optical path in a horizontal direction at the first end point 301 and the receiving signal is exited the annular optical path vertically at the first end point 301.

In the present exemplary embodiment, the second end point 302 of the annular optical path is opposite the composite optical transmission port, and the composite optical transmission port is coupled with a single optical fiber. The emitting signal entered the annular optical path is exited at the second end point 302, and is transmitted to the single optical fiber through the composite optical transmission port, and meanwhile, the receiving signal received through the single optical fiber enters the annular optical path at the second end point through the composite optical transmission port. Accordingly, the composite optical transmission port is configured to transmit both the emitting signal and the receiving signal.

In the present exemplary embodiment, an optical signal generation assembly comprises a laser capable of modulating signals, which is configured to emit a laser beam loaded with the emitting signal.

In the present exemplary embodiment, the optical signal detection assembly comprises a photodetector, which is configured to obtain, at an optical output port, the receiving signal received from the optical fiber.

In the present exemplary embodiment, as shown in FIG. 3 and FIG. 4, the composite optical transmission port is a COM port, the optical input port is a TOSA optical input port, and the optical output port is a ROSA optical output port. In FIG. 3, the emitting signal is input from the TOSA optical input port through the transmission optical path and then enters the annular optical path (formed by P light and S in the figure) at the first end point (i.e. in the figure, it is in a direction from the TOSA to the COM, and at the first intersection of the P light and the S light), and output at the second end point (i.e. in the figure, it is in the direction from the TOSA to the COM, and at the second intersection of the P light and the S light) after passing through the annular optical path, and enters the COM port.

In FIG. 4, the receiving signal is input from the COM port, and is incident into the annular optical path (formed by P light and S light in the figure) at the second end point (i.e. in the figure, it is in the direction from the COM to the ROSA, and at the first intersection of the P light and the S light), then is output at the first end point (i.e. in the figure, it is in the direction from the COM to the ROSA, at the second intersection of the P light and the S light), and is exited to the optical output port through the transmission optical path.

In FIG. 3, the optical path formed by the P light and the S light is an output optical path in the annular optical path which is configured to output an emitting signal input at a first end point in the first incident direction. In FIG. 4, the optical path formed by the P light and the S is an input optical path in the annular optical path which is configured to input a receiving signal at the first end point in the first exit direction.

In some embodiments, the first optical path and the third optical path respectively comprise:
  the first polarization light-splitting prism, the first half-wave plate, the Faraday rotating plate, and the second polarization light-splitting prism; and
  the second optical path and the fourth optical path respectively comprise:
  the first polarization light-splitting prism, the second half-wave plate, the Faraday rotating plate, the third half-wave plate, the triangular prism and the second polarization light-splitting prism.

In the present exemplary embodiment, optical devices comprised in the first optical path and the third optical path are the same, however, the transmission directions of the first optical path and the third optical path are opposite to each other. Optical devices comprised in the second optical path and the fourth optical path are the same, however, the transmission directions of the second optical path and the fourth optical path are opposite to each other.

In the present exemplary embodiment, the transmission directions of the first optical path and the fourth optical path may both be in the clockwise direction, and the transmission directions of the second optical path and the third optical path may both be in the counterclockwise direction.

In the present exemplary embodiment, the first polarization light splitting film and the second polarization light splitting film are both prism type polarization light splitting films. The prism type polarization splitting film uses the polarization effect of the interface when a light beam is incident at the Brewster angle. When the light beam is incident on the interface of the two materials at the Brewster angle, no matter how much the number of the thin film layers, the reflection light thereof vibrating in the horizontal direction is always zero, while the reflection light thereof vibrating in the vertical direction increases along with the increase of the number of the thin film layers, and as long as the number of layers is enough, it can be realized that the penetration light beam substantially is the light vibrating in the horizontal direction, and the reflection light beam substantially is the light vibrating in the vertical direction, so as to achieve the purpose of polarization light splitting. Since it is impossible to achieve the Brewster angle on the interface of the two thin film materials when light is incident from the air, the thin film is plated on a prism, and at this time, the incident medium is not air but glass.

In the present exemplary embodiment, the first polarization light splitting film and the second polarization light splitting film are both plated on the end face of a prism, and the number of the thin film layers is enough to reflect the light of vertical component.

In the present exemplary embodiment, the first polarization light splitting film 381 is plated on the first prism end face of the first polarization light-splitting prism 38 to form the first end point, and the incident light can be directly incident on the first polarization light splitting film 381 of the first prism end face. The second polarization light splitting film 321 is plated on the fifth prism end face of the second polarization light-splitting prism 32 to form the second end point, and the receiving signal can be directly incident on the second polarization light splitting film 321 directly from the optical fiber.

In the present exemplary embodiment, the first half-wave plate is located between the first polarization light-splitting prism and the second polarization light-splitting prism; and
    the Faraday rotating plate is located between the first half-wave plate and the second polarization light-splitting prism.

In the present exemplary embodiment, the first prism end face of the first polarization light-splitting prism 38 is plated with the first polarization light splitting film 381 to form the first end point, and the second prism end face of the first polarization light-splitting prism 38 is plated with a first reflecting film 382, wherein the first prism end face of the first polarization light-splitting prism 38 is opposite to the second prism end face of the first polarization light-splitting prism 38;
    the fifth prism end face of the second polarization light-splitting prism 32 is plated with the second polarization light splitting film 321 to form the second end point, and the sixth prism end face of the second polarization light-splitting prism 32 is plated with a third reflecting film 322, wherein the fifth prism end face of the second polarization light-splitting prism 32 is opposite to the sixth prism end face of the second polarization light-splitting prism 32.

In some embodiments, as shown in FIG. 3 and FIG. 4, in the first optical path, the first polarization light-splitting prism 38, the first half-wave plate 37, the Faraday rotating plate 35, and the second polarization light-splitting prism 32 are all set parallel with each other, wherein
    a central axis of the first prism end face of the first polarization light-splitting prism 38 in the horizontal direction is aligned with a central axis of the first half-wave plate 37;
    the central axis of the first half-wave plate 37 is aligned with a central axis of an upper half portion of the Faraday rotating piece 35; and
    the central axis of the upper half portion of the Faraday rotating plate 35 is aligned with a central axis of the sixth prism end face of the second polarization light-splitting prism 32 in the horizontal direction.

In the present exemplary embodiment, the first prism end face of the first polarization light-splitting prism 38 may be an inclined surface of 45 degrees. The first polarization light splitting film 381 is plated on the inclined surface. Meanwhile, the first polarization light-splitting prism 38, the first half-wave plate 37, the Faraday rotating plate 35, and the second polarization light-splitting prism 32 are all set parallel with each other, so that the light beams incident on the inclined surface of 45 degrees in parallel can be exited to the first half-wave plate 37 in parallel after penetrating the first polarization light splitting film 381, and then are incident into a subsequent device in parallel, or the light beams can also be vertically down or upward output through reflection of the first polarization light splitting film 381, thus realizing the light beams incident in parallel are output in parallel or in the vertical direction, so as to facilitate the transmission direction adjustment of the light beam.

In the present exemplary embodiment, the second half-wave plate is located between the first polarization light-splitting prism and the second polarization light-splitting prism;
    the Faraday rotating plate is located between the second half-wave plate and the second polarization light-splitting prism; and
    the third half-wave plate is located between the Faraday rotating plate and the second polarization light-splitting prism.

In some embodiments, as shown in FIG. 3 and FIG. 4, in the second optical path, the first polarization light-splitting prism 38, the second half-wave plate 36, the Faraday rotating plate 35, the third half-wave plate 34, and the second polarization light-splitting prism 32 are all set parallel with each other, wherein
    a central axis of the second prism end face of the first polarization light-splitting prism 38 in the horizontal direction is aligned with a central axis of the second half-wave plate 36;
    the central axis of the second half-wave plate 36 is aligned with a central axis of a lower half portion of the Faraday rotating piece 35; and
    the central axis of the lower half portion of the Faraday rotating plate 35 is aligned with a central axis of the third half-wave plate 34.

In the present exemplary embodiment, the first prism end face of the second polarization light-splitting prism 32 may be an inclined surface of 45 degrees too. The second polarizing spectroscopic film 321 is plated on the inclined surface. The receiving signal received from the optical fiber is incident on the inclined surface in parallel, and is exited in parallel after penetrating the second polarization light splitting film 321, or is reflected by the second polarization light splitting film 321 and it output in the vertical direction. The fifth prism end face of the second polarization light-splitting prism 32 is bonded with the inclined surface of the triangular prism 33. The second polarization light splitting film 321 is bonded between the fifth prism end face of the second polarization light-splitting prism 32 and the inclined surface of the triangular prism 33, so that the light beams penetrating the second polarization light splitting film 321 are incident on the triangular prism 33 in parallel, so as to be exited in parallel from the vertical surface of the triangular prism 33. Meanwhile, the central axes of the devices are aligned, which is conducive to light beam transmission and the adjustment of the light beam transmission direction.

In the present exemplary embodiment, the triangular prism is located between the third half-wave plate and the second polarization light-splitting prism, and the inclined surface of the triangular prism is opposite to the fifth prism end face of the second polarization light-splitting prism.

In the present exemplary embodiment, as shown in FIG. 3 and FIG. 4, the central axis of the third half-wave plate 34 is aligned with a central axis of a vertical plane of the triangular prism 33, wherein the vertical plane of the triangular prism 33 is opposite to the third half-wave plate 34; and the inclined surface of the triangular prism 33 is bonded with the fifth prism end face of the second polarization light-splitting prism 32.

In the present exemplary embodiment, an emitting signal is incident to the first prism end face of the first polarization light-splitting prism 38, and is split into a first polarization light beam with a first polarization angle and a second polarization light beam with a second polarization angle through the first polarization splitting film 381; the first polarization light beam penetrates the first polarization light splitting film 381, the first half-wave plate 37 and the Faraday rotating plate 35 to the second polarization light-splitting prism 32, then it is reflected to the first prism end face of the second polarization light-splitting prism 32 through the third reflecting film 322 of the second polarization light-splitting prism 32, and then it is reflected to the composite optical transmission port 1 through the second polarization light beam splitting film 321.

In the present exemplary embodiment, the second polarization light beam is reflected to the second prism end face of the first polarization light-splitting prism 38 through the first polarization light splitting film 381, and reflected to the second half-wave plate 36 through the first reflecting film 382, then it penetrates the second half-wave plate 36, the Faraday rotating plate 35, the third half-wave plate 34 and the triangular prism 33 to the first prism end face of the second polarization light-splitting prism 32, and then penetrates the second polarization light splitting film 321 to the composite optical transmission port 1.

In the present exemplary embodiment, the receiving signal is incident on the third prism end face of the second polarization light-splitting prism 32, and is split into a third polarization light beam with the first polarization angle and a fourth polarization light beam with the second polarization angle through the second polarization splitting film 321; and the third polarization light beam penetrates the second polarization light splitting film 321, the triangular prism 33, the third half-wave plate 34, the Faraday rotating plate 35 and the second half-wave plate 36 to the second prism end face of the first polarization light-splitting prism 38, and it is reflected to the first prism end face of the first polarization light-splitting prism 38 through the first reflecting film 382 and then penetrates the first polarization light splitting film 381 to the light output port.

In the present exemplary embodiment, the fourth polarization light beam is reflected to the sixth prism end face of the second polarizing beam splitter prism 32 through the second polarization light splitting film 321, then is reflected to the Faraday rotating plate 35 through the third reflecting film 322, and then penetrates the Faraday rotating plate 35 and the half-wave plate 37 to the first prism end face of the first polarization light-splitting prism 38, and is reflected to the optical output port through the first polarization light splitting film 381.

In some embodiments, a polarization deflection angle of the third half-wave plate is twice as large as a polarization deflection angle of the Faraday rotating plate.

In the present exemplary embodiment, a polarization deflection angle of the first half-wave plate 37, a polarization deflection angle of the second half-wave plate 36, and a polarization deflection angle of the Faraday rotating plate 35 ranges from 0 to 90 degrees, and each may be any angle between 0 and 90 degrees. For example, the polarization deflection angles of the first half-wave plate 37, the second half-wave plate 36 and the Faraday rotating plate 35 may be 45 degrees respectively, and the polarization deflection angle of the third half-wave plate 34 may be 90 degrees.

In the present exemplary embodiment, the first polarization angle may be 0 degree, and the second polarization angle may be 90 degrees.

When the first polarization light beam penetrates the first half-wave plate 37 and the Faraday rotating plate 35, an angle between a vibration plane of the first polarization light beam and an optical axis of the first half-wave plate 37 is 22.5 degrees, and the rotation angle of the Faraday rotating plate 35 is 45 degrees, thus realizing that the polarization angle of the first polarization light beam is converted from the first polarization angle to the second polarization angle after the first polarization beam penetrates the first half-wave plate 37 and the Faraday rotating plate 35.

When the second polarization light beam penetrates the second half-wave plate 36, the Faraday rotating plate 35 and the third half-wave plate 34, an angle between a vibration plane of the second polarization light beam and an optical axis of the second half-wave plate 36 is −22.5 degrees, and the rotation angle of the Faraday rotating plate 35 is 45 degrees, and an angle between the vibration plane of the second polarization light beam after penetrating the Faraday rotating plate 35 and an optical axis of the third half-wave plate 34 is −45 degrees, thus realizing that the polarization angle of the second polarization light beam is converted from the second polarization angle to the first polarization angle after the second polarization beam penetrates the second half-wave plate 36, the Faraday rotating plate 35 and the third half-wave plate 34.

When the third polarization light beam penetrates the third half-wave plate 34, an angle between a vibration plane of the third polarization light beam and an optical axis of the third half-wave plate 34 is 45 degrees, thus realizing that the polarization angle of the third polarization light beam is converted from the first polarization angle to the second polarization angle after the third polarization beam penetrates the third half-wave plate 34.

When the third polarization light beam after penetrating the third half-wave plate 34 penetrates the Faraday rotating plate 35 and the second half-wave plate 36, the rotation angle of the Faraday rotating plate 35 is 45 degrees, and an angle between a vibration plane of the third polarization light beam and an optical axis of the second half-wave plate 36 is 45 degrees, thus realizing that the polarization angle of the third polarization light beam is converted from the second polarization angle to the first polarization angle after the third polarization beam penetrates the Faraday rotating plate 35 and the second half-wave plate 36.

When the fourth polarization light beam penetrates the Faraday rotating plate 35 and the first half-wave plate 37, the rotation angle of the Faraday rotating plate 35 is 45 degrees, and an angle between a vibration plane of the fourth polarization light beam and an optical axis of the first half-wave plate 37 is −22.5 degrees, so that the polarization state of the fourth polarization light beam remains unchanged after the fourth polarization light beam penetrates the Faraday rotating plate 35 and the half-wave plate 37.

In the present exemplary embodiment, the third prism end face of the optical path offset prism 39 may be bonded with the first prism end face of the first polarization light-splitting prism 38. The first polarization light splitting film may be bonded between the third prism end face of the optical path offset prism 39 and the first prism end face of the first polarization light-splitting prism 38. The optical path offset prism 39 is mainly configured to extend an optical path where the receiving signal is located after it passes through the first polarization light splitting film, so that the output optical path where the receiving signal is located is transmitted to the optical output port through the optical path offset prism 39, so as to further distinguish the emitting signal from the receiving signal.

In the present disclosure, the composite optical transmission port is a COM port, the optical input port is a TOSA optical input port, and the optical output port is a ROSA optical output port.

As shown in FIG. 2, the single-optical-fiber bidirectional transceiving device as disclosed in the present disclosure comprises a composite optical transmission port (optical transceiving port) 1, a welding substrate 2, a bidirectional optical transmission assembly 3, a collimating lens group 4, an optical guide assembly 5, a collimating lens array 6, an optical signal generation assembly (laser array assembly) 7, an optical signal detection group (detector array) 8, and a heat dissipation substrate 9. The composite optical transmission port 1 is welded at one end of the welding substrate 2 through laser; the bidirectional optical transmission assembly 3, the collimating lens group 4, the optical guide assembly 5, and the lens array 6 are successively fixed on the upper surface of the welding substrate 2 through glue; and the optical signal generation assembly 7 is fixed to an upper surface of one side of the heat dissipation substrate 9 through a thermally conductive adhesive. The other side of the heat dissipation substrate 9 is bonded and fixed to the lower surface of the welding substrate 2 through glue. The detector is located on an upper surface of a demultiplexing chip in the optical guide assembly 5.

TOSA, is the abbreviation of Transmitter Optical Subassembly, and is expressed as optical transmission sub-module in under the Chinese context, which is mainly used to convert electrical signals into optical signals (E/O conversion). The performance index thereof includes an optical power, a threshold value and the like.

ROSA, is the abbreviation of Receiver Optical Subassembly, and it is expressed as an optical receiving subassembly under the Chinese context, which is mainly used to convert optical signals into electrical signals (O/E conversion). The main performance index includes sensitivity (Sen) and the like.

The structure of the bidirectional optical transmission assembly 3 as described in the present disclosure, as shown in FIG. 3, FIG. 4, comprises a COM port, a TOSA optical input port and a ROSA optical output port, and a first polarization light-splitting prism 38, a triangular prism 33, a third half-wave plate 34, a Faraday rotating plate 35, a first half-wave plate 37, a second half-wave plate 36, a second polarization light-splitting prism 32 and an optical path offset prism 39 are sequentially bonded in a direction from the COM port to the TOSA or the ROSA port, wherein the inclined surface portions of all the prisms are 45 degrees. Furthermore, a second polarization light splitting film 321 is arranged between the second polarization light-splitting prism 32 and the triangular prism 33, a first polarization light splitting film 381 is arranged between the first polarization light-splitting prism 38 and the optical path offset prism 39, and the other side of the first polarization light-splitting prism 38, the second polarization light-splitting prism 32, the optical path offset prism 39 opposite to the polarization light splitting film are all plated with reflecting films; the first half-wave plate 37 and the second half-wave plate 36 respectively form an optical rotation unit with the Faraday rotating plate 35, however, the optical axis directions of the first half-wave plate 37 and the second half-wave plate 36 are 22.5 degrees and −22.5 degrees, respectively, and the effect achieved is to realize that in the direction of an optical path from the COM port to the TOSA or ROSA port, the polarization direction of the optical path is rotated by 90 degrees through the combination of the Faraday rotating piece 35 and the second half-wave plate 36, and the combination of the Faraday rotating plate 35 and the first half-wave plate 37 realizes that the optical path polarization direction is unchanged; for the direction of an optical path from the TOSA or the ROSA port to the COM port, the combination of the Faraday rotating piece 35 and the first half-wave plate 36 remains the optical path polarization direction unchanged and the combination of the Faraday rotating piece 35 and the first half-wave plate 36 rotates the optical path polarization direction by 90 degrees; and the Faraday rotating plate 35 is bonded with a magnetic block 31 on both sides.

The function of the optical path ring shaped chipware assembly 3 as disclosed in the present disclosure is to satisfy that the light input from the TOSA optical input port is output from the COM port, and the light input from the COM port is output from the ROSA optical output port, wherein the working principle of the optical path from the TOSA optical input port to the COM port is as shown in FIG. 2 that the light from the TOSA port is split into two paths through the first polarization splitting film 381 after being input into the first polarization light-splitting prism 38, one of which is the reflected S light, wherein the reflected S light is reflected again by the first reflecting film 382, then enters an optical rotation unit composed of the second half-wave plate 36 and the Faraday rotating plate 35 and is output as the S light, then it passes through the third half-wave plate 34 and is rotated by 90 degrees to become P light and then is output to the COM port through the penetration; and the other of which is the penetrated P light through the first polarization light splitting film 381, wherein the penetrated P light penetrates into an optical rotation unit composed of the first half-wave plate 37 and the Faraday rotating plate 35, and is rotated into S light, then the S light enters the second polarization light-splitting prism 32 and is reflected by the second reflecting film 322, and then is reflected by the second polarization light splitting film 321 and output to the COM end.

The working principle of the optical path from the COM port to the ROSA optical output port is as shown in FIG. 4: the light from the COM port is input into the second polarization light-splitting prism 32, and is split into two paths through the second polarization light splitting film

321, one path of which is the reflected S light, wherein the reflected S light is reflected again by the second reflecting film 322 and enters an optical rotation unit composed of the first half-wave plate 37 and the Faraday rotating plate 35, then the S light output is kept entering the optical path offset prism 39, and then is reflected twice by the first polarization light splitting film 381 and the third reflecting film 391 and is output from the ROSA optical output port; and the other path of which is the penetrated P light, wherein the penetrated P light passes through the triangular prism, then enters the third half-wave plate 34 and is rotated by 90 degrees to become S light, and then the S light penetrates into enters the optical rotation unit composed of the second half-wave plate 36 and the Faraday rotating plate 35, and is rotated into P light, and then the p light enters the first polarization light-splitting prism 38 and is reflected by the first reflecting film 382, and then penetrates the first polarization splitting film 381 and enters the optical path offset prism 39, and finally, it is reflected by the third reflecting film 391 and is output from the ROSA light output port.

Figure 5:
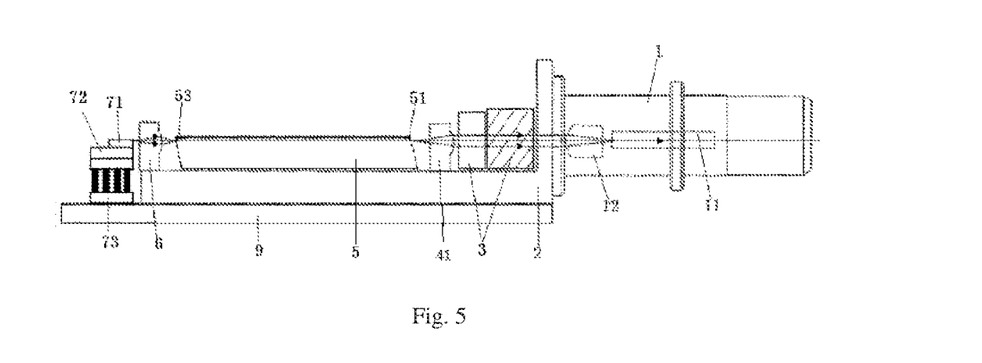
FIG. 5 is a TOSA partial optical path working principle schematic diagram of a single-optical-fiber bidirectional transceiving device according to an exemplary embodiment.

FIG. 5 is a working principle schematic diagram of TOSA partial optical path of a single-optical-fiber bidirectional transceiving device according to an exemplary embodiment. As shown in FIG. 5, a laser chip 71 in the optical signal generation assembly (laser array assembly) 7 generates and outputs a laser, which is converged into the beam combining waveguide structure 53 of the optical guide assembly 5 through the lens array 6, then it is multiplexed through the optical guide assembly 5 and output from the common port 51, and then it is collimated by the first collimating lens 41 in the collimating lens group 4, and then it enters the TOSA optical input port of the bidirectional optical transmission assembly 3 and is output from the COM port of the bidirectional optical transmission assembly 3, and finally it is converged into the optical fiber pin 11 through the third collimating lens 12 in the composite optical transmission port (optical transceiver port) 1 to be output. The laser array assembly 7 comprises a laser chip 71, a laser chip substrate 72 and a thermo electric cooler 73, and the overall height of the laser array assembly 7 is designed to be matched with that of the waveguide. For the uncooled laser array, thermo electric cooler 73 can be replaced by a tungsten copper substrate or an aluminum nitride substrate with high thermal conductivity.

Figure 6:
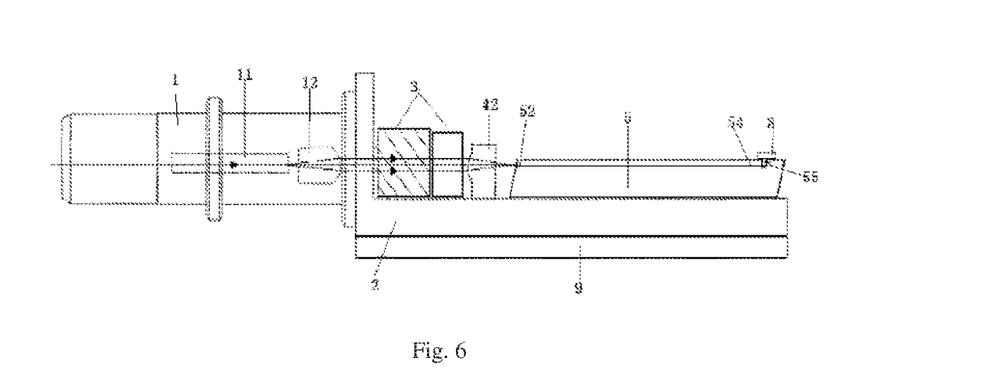
FIG. 6 is a ROSA partial optical path working principle schematic diagram of a single-optical-fiber bidirectional transceiving device according to an exemplary embodiment.

FIG. 6 is a working principle schematic diagram of a ROSA partial optical path of a single-optical-fiber bidirectional transceiving device according to an exemplary embodiment. As shown in FIG. 6, the received light is input from the optical transceiver port 1 and collimated through the collimating lens 12, and enters the COM port of the optical ring shaped chipware assembly 3 of the optical path, then it is output from the ROSA port of the optical ring shaped chipware assembly 3, and then it is converged into the common port 52 of the optical guide assembly 5 through the second quasi-lens 42 in the lens group 4, and then is split through the beam splitting waveguide structure 54 in the optical guide assembly 5. One end of the beam splitting waveguide structure 54 is etched with a reflection inclined plane of 40 to 50 degrees. The reflective inclined surface is plated with a reflecting film. As shown in FIG. 6, light transmitted in the horizontal waveguide is output from the beam splitting waveguide structure 54, reaches the reflective inclined surface 55 formed by etching and is reflected to the upper surface of the chip, and then is received by the photosensitive surface of the optical signal detection group (detector array) 8 on the upper surface of the chip.

The optical guide assembly 5 described in the present disclosure may be an integrated chip, and comprises both a combined chip and a demultiplexing chip, but it is not excluded two independent multiplexing chip and demultiplexing chip.

The collimating lens group 4 as disclosed in the present disclosure is configured to realize the match of collimated light and a waveguide mode field, and the lens array 6 realizes the match of the laser mode field and the waveguide mode field.

The material of the welding substrate 2 as described in the present disclosure is Kovar, which may be welded with a composite optical transmission port (optical transceiver port) 1.

The heat dissipation substrate 9 as described in the present disclosure is a tungsten copper or an aluminum nitride substrate to realize rapid heat dissipation of the laser.

In order to reduce the influence of the optical path reflection, all of the end faces of the single-optical-fiber bidirectional transceiving device as described in the present disclosure in the optical path penetration direction is plated with an antireflection film.

The optical signal generation assembly (laser array assembly) 7 comprises a laser chip 71, a laser chip substrate 72 and a thermo electric cooler 73, and the overall height is designed to be matched with the height of the waveguide. For the uncooled laser array, thermo electric cooler 73 without temperature control requirements, it may be replaced by a tungsten copper substrate or an aluminum nitride substrate with high heat conductivity.

The material of the welding substrate 2 is Kovar, which may be welded with the composite optical transmission port (optical transceiver port) 1.

The heat dissipation substrate 9 is a tungsten copper or an aluminum nitride substrate so as to realize rapid heat dissipation of the laser.

All of the end faces of the single-optical-fiber bidirectional transceiving device in the optical path penetration direction are plated with an antireflection film.

The advantages of the present disclosure are that, a single chip meets the needs of demultiplexing and multiplexing signals at the same time by using the integration features of the planar optical waveguide devices, and then the whole device has a compact and stable structure and can be configured in a compact optical module by coupling with the bidirectional optical transmission assembly.

The present disclosure further provides an optical fiber communication system. The optical fiber communication system includes the single-optical-fiber bidirectional transceiving device as described in each abovementioned embodiment, which not only decreases the usage quantity of optical fiber, but also reduces the maintenance cost of the device.

Those skilled in the art will easily think out other embodiments of the present disclosure after considering the specification and practicing the invention disclosed herein. The present disclosure is intended to cover any variant, use or adaptive change of the present disclosure, and these variants, uses or adaptive changes follow the general principles of the present disclosure and include the common knowledge or conventionally used technical means in the art not disclosed in the present disclosure. The description and the embodiments are only regarded as exemplary, and the real scope and spirit of the present disclosure are indicated by the claims below.

It should be understood that the present disclosure is not limited to the precise structure described above and shown in the accompanying drawings, and various modifications and changes can be made without departing from its scope. The scope of the present disclosure is limited only by the appended claims.

The foregoing is only preferred embodiments of the present disclosure and is not configured to limit the scope of protection of the present disclosure.

What is claimed is:

1. A single-optical-fiber bidirectional transceiving device, comprising:
an optical input port, an optical output port, and a composite optical transmission port;
wherein the optical input port is located on a first end face, and is configured to output an emitting signal, which is input from the optical input port, to the composite optical transmission port;
the optical output port is located on the first end face in parallel with the optical input port, and is configured to output a receiving input from the composite optical transmission port; and
the composite optical transmission port is located on a second end face opposite to the first end face, and is configured to be coupled with an optical fiber;
a bidirectional optical transmission assembly and an optical guide assembly, both of which are located between the first end face and the second end face, the bidirectional optical transmission assembly being located between the second end face and the optical guide assembly, and the optical guide assembly being located between the first end face and the bidirectional optical transmission assembly,
wherein the bidirectional optical transmission assembly is configured to transmit the receiving signal input from the composite optical transmission port to the optical guide assembly, and transmit the emitting signal output from the optical guide assembly to the composite optical transmission port;
wherein the optical guide assembly is configured to transmit the emitting signal input from the optical input port to the bidirectional optical transmission assembly, and transmit the receiving signal output from the bidirectional optical transmission assembly to the optical output port,
wherein the bidirectional optical transmission assembly comprises:
a first transmission assembly, a second transmission assembly, and a third transmission assembly, which are located sequentially in a direction from the first end face to the second end face in the bidirectional optical transmission assembly,
wherein the first transmission assembly comprises a first polarization light-splitting prism and an optical path offset prism connected to the first polarization light-splitting prism in a vertical direction, wherein the first polarization light-splitting prism has a first prism end face and a second prism end face, and the optical path offset prism has a third prism end face and a fourth prism end face, the third prism end face being bonded with the first prism end face;
the second transmission assembly comprises a Faraday rotating plate, and a first half-wave plate, a second half-wave plate and a third half-wave plate which three are bonded with surfaces of the Faraday rotating plate, wherein the first half-wave plate and the second half-wave plate are both bonded with a first surface of the Faraday rotating plate, the first half-wave plate being bonded with an upper half portion of the first surface, the second half-wave plate being bonded with a lower half portion of the first surface; the third half-wave plate is bonded with a lower half portion of a second surface of the Faraday rotating plate, directly facing the second half-wave plate; and the first surface and the second surface are two faces directly facing the Faraday rotating plate in parallel; and
the third transmission assembly comprises a second polarization light-splitting prism and a triangular prism which are connected in a vertical direction, wherein the second polarization light-splitting prism has a fifth prism end face and a sixth prism end face, the fifth prism end face is connected with an inclined surface of the triangular prism; and a vertical surface of the triangular prism in the vertical direction is directly facing the third half-wave plate.

2. The single-optical-fiber bidirectional transceiving device of claim 1, wherein the optical input port is a plurality of optical input ports set in parallel, and the optical output port is a plurality of optical output ports set in parallel;
the optical guide assembly comprises a beam combining waveguide structure and a beam splitting waveguide structure set in parallel, wherein the beam combining waveguide structure has an input end facing the plurality of optical input ports and an output end facing the bidirectional optical transmission assembly, and is configured to combine a plurality of emitting signals incident from the plurality of optical input ports, and transmit the combined emitting signals to the bidirectional optical transmission assembly; and the beam splitting waveguide structure has an input end facing the bidirectional optical transmission assembly and an output end facing the plurality of optical input ports, and is configured to split the receiving signal output by the bidirectional optical transmission assembly into a plurality of light-splitting receiving signals respectively corresponding to the plurality of optical output ports set in parallel, and transmit different light-splitting receiving signals of the plurality of light-splitting receiving signals to different optical output ports.

3. The single-optical-fiber bidirectional transceiving device of claim 2, wherein the optical guide assembly is a planar lightwave circuit (PLC) chip.

4. The single-optical-fiber bidirectional transceiving device of claim 2, further comprising:
a first collimating lens, which is located between the optical guide assembly and the bidirectional optical transmission assembly, and which is configured to collimate the combined emitting signal output from the beam combining waveguide structure;
a second collimating lens, which is arranged in parallel with the first collimating lens, and which is configured to collimate the receiving signal output by the bidirectional optical transmission assembly; and
a third collimating lens, which is located between the bidirectional optical transmission assembly and the optical fiber, and which is configured to collimate the emitting signal transmitted to the composite optical transmission port, and is configured to collimate the receiving signal transmitted to the bidirectional optical transmission assembly by the optical fiber.

5. The single-optical-fiber bidirectional transceiving device of claim 4, further comprising:
a lens array, which is located between the plurality of optical input ports and the optical guide assembly, wherein lenses in the lens array are in one-to-one correspondence with each optical input port in the plurality of optical input ports, and is configured to couple the emitting signal input by the plurality of optical input ports into the beam combining waveguide of the optical guide assembly.

6. The single-optical-fiber bidirectional transceiving device of claim 5, wherein the signal transmission end of the beam splitting waveguide structure in the optical guide assembly is provided with a plurality of signal reflective inclined surfaces in one-to-one correspondence with the plurality of optical output ports, and the plurality of light-splitting receiving signals output by the beam splitting waveguide structure are reflected to the optical output port through the plurality of signal reflective inclined surfaces.

7. The single-optical-fiber bidirectional transceiving device of claim 1, wherein the bidirectional optical transmission assembly in itself has an annular optical path;
the annular optical path comprises a first end point and a second end point which are located at different points on the annular optical path, the first end point being located on the first prism end face of the first polarization light-splitting prism, and the second end point being located on the fifth prism end face of the second polarization light-splitting prism,
wherein an output optical path comprising a first optical path and a second optical path is formed from the first end point to the second end point, and is configured to output the emitting signal which is input in a first incident direction at the first end point; and
an input optical path comprising a third optical path and a fourth optical path is formed from the second end point to the first end point, and is configured to input the receiving signal which is output in a first exit direction at the first end point; the first incident direction and the first exit direction are different; and the transmission directions of the first optical path and the third optical path are opposite, and the transmission directions of the second optical path and the fourth optical path are opposite.

8. The single-optical-fiber bidirectional transceiving device of claim 7, wherein both the first optical path and the third optical path comprise:
the first polarization light-splitting prism, the first half-wave plate, the Faraday rotating plate, and the second polarization light-splitting prism; and
both the first optical path and the third optical path comprise: the first polarization light-splitting prism, the second half-wave plate, the Faraday rotating plate, the third half-wave plate, the triangular prism and the second polarization light-splitting prism.

9. The single-optical-fiber bidirectional transceiving device of claim 8, wherein a polarization deflection angle of the third half-wave plate is twice as large as a polarization deflection angle of the Faraday rotating plate.

10. A single-optical-fiber bidirectional transceiving device, comprising:
an optical input port, an optical output port, and a composite optical transmission port;
wherein the optical input port is located on a first end face, and is configured to output an emitting signal, which is input from the optical input port, to the composite optical transmission port;
the optical input port is a plurality of optical input ports set in parallel, and the optical output port is a plurality of optical output ports set in parallel;
the optical output port is located on the first end face in parallel with the optical input port, and is configured to output a receiving signal input from the composite optical transmission port; and
the composite optical transmission port is located on a second end face opposite to the first end face, and is configured to be coupled with an optical fiber;
a bidirectional optical transmission assembly and an optical guide assembly, both of which are located between the first end face and the second end face, the bidirectional optical transmission assembly being located between the second end face and the optical guide assembly, and the optical guide assembly being located between the first end face and the bidirectional optical transmission assembly;
a first collimating lens, which is located between the optical guide assembly and the bidirectional optical transmission assembly, and which is configured to collimate a combined emitting signal output from a beam combining waveguide structure;
a second collimating lens, which is arranged in parallel with the first collimating lens, and which is configured to collimate the receiving signal output by the bidirectional optical transmission assembly; and
a third collimating lens, which is located between the bidirectional optical transmission assembly and the optical fiber, and which is configured to collimate the emitting signal transmitted to the composite optical transmission port, and is configured to collimate the receiving signal transmitted to the bidirectional optical transmission assembly by the optical fiber;
wherein the bidirectional optical transmission assembly is configured to transmit the receiving signal input from the composite optical transmission port to the optical guide assembly, and transmit the emitting signal output from the optical guide assembly to the composite optical transmission port;
the optical guide assembly is configured to transmit the emitting signal input from the optical input port to the bidirectional optical transmission assembly, and transmit the receiving signal output from the bidirectional optical transmission assembly to the optical output port; and
the optical guide assembly comprises the beam combining waveguide structure and a beam splitting waveguide structure set in parallel, wherein the beam combining waveguide structure has an input end facing the plurality of optical input ports and an output end facing the bidirectional optical transmission assembly, and is configured to combine a plurality of emitting signals incident from the plurality of the optical input ports, and transmit the combined emitting signal to the bidirectional optical transmission assembly; and the beam splitting waveguide structure has an input end facing the bidirectional optical transmission assembly and an output end facing the plurality of optical input ports, and is configured to split the receiving signal output by the bidirectional optical transmission assembly into a plurality of light-splitting receiving signals respectively corresponding to the plurality of optical output ports set in parallel, and transmit different the light-splitting receiving signals to different optical output ports.

* * * * *